United States Patent [19]

Yoshikawa et al.

[11] Patent Number: 5,169,823
[45] Date of Patent: Dec. 8, 1992

[54] METHOD FOR STABILIZING TREATMENT OF CATALYTIC ACTIVITY

[75] Inventors: Yukihiro Yoshikawa, Mobara; Tooru Hihara, Ohmuta; Teruo Hirayama, Ohmuta; Kunihiro Yamada, Ohmuta; Shinji Takenaka, Ohmuta, all of Japan

[73] Assignee: Mitsui Toatsu Chemicals, Inc., Tokyo, Japan

[21] Appl. No.: 721,432

[22] Filed: Jul. 1, 1991

[30] Foreign Application Priority Data

Jul. 5, 1990 [JP] Japan .................................. 2-176295

[51] Int. Cl.$^5$ .................. B01J 23/26; B01J 21/06; B01J 23/92
[52] U.S. Cl. .................................... 502/256; 502/319
[58] Field of Search ................ 502/319, 256; 423/502, 423/507, 607

[56] References Cited

U.S. PATENT DOCUMENTS

| | | | |
|---|---|---|---|
| 4,040,860 | 8/1977 | Mansmann et al. | 423/607 X |
| 4,296,076 | 10/1981 | Swales et al. | 423/607 X |
| 4,774,070 | 9/1988 | Itoh et al. | 423/502 |
| 4,803,065 | 2/1989 | Itoh et al. | 423/502 |
| 4,828,815 | 5/1989 | Kiyoura et al. | 423/502 |
| 5,036,036 | 7/1991 | Lerou | 502/319 X |

FOREIGN PATENT DOCUMENTS

| | | | |
|---|---|---|---|
| 0331465 | 9/1989 | European Pat. Off. | |
| 62-241804 | 10/1987 | Japan | |
| 0584790 | 1/1947 | United Kingdom | |
| 0676667 | 7/1952 | United Kingdom | |
| 0713282 | 8/1954 | United Kingdom | 502/256 |
| 846832 | 8/1960 | United Kingdom | |

Primary Examiner—W. J. Shine
Assistant Examiner—Douglas J. McGinty
Attorney, Agent, or Firm—Millen, White, Zelano and Branigan

[57] ABSTRACT

Disclosed herein is a method for the stabilizing treatment of a catalyst comprising washing the catalyst with hot washing water following the preparation of the catalyst, the catalyst being composed principally of chromium oxide and used in the production of chlorine by the oxidation of hydrogen chloride with an oxygen-containing gas, thereby improving its catalytic activity and prolonging its life.

8 Claims, No Drawings

METHOD FOR STABILIZING TREATMENT OF CATALYTIC ACTIVITY

BACKGROUND OF THE INVENTION a) Field of the Invention

This invention relates to a method for stabilizing treatment of the activity of chromium oxide catalysts used in the production of chlorine by the catalytic oxidation of hydrogen chloride.

b) Description of the Prior Art

The production process of chlorine by the oxidation of hydrogen chloride has been known as Deacon reaction from long ago. The copper catalysts invented by Deacon in 1868 have been regarded to date as exhibiting the most excellent activity, and a number of catalysts have been proposed which comprise copper chloride and potassium chloride with various compounds incorporated as the third component.

However, in order to oxidize hydrogen chloride at an industrially acceptable range of reaction velocity by the use of these catalysts, it is necessary to increase the reaction temperature to 450° C. or higher, which raises such problems as the reduction of catalyst life accompanying the scattering of anyone of catalyst components. Further, the oxidation reaction of hydrogen chloride is an equilibrium reaction and therefore the amount of chlorine formed decreases as the reaction temperature becomes higher. Accordingly, it has become necessary to develop catalysts which are active at a temperature as low as possible.

From these points of view, catalysts other than those of copper have been proposed. However, none of the catalyst has been reported which gives practically acceptable performances.

Chromium oxide catalysts have a higher stability and resistance to a high temperature than that of copper catalysts, so as to be proposed to use it as an oxidizing catalyst of hydrogen chloride. However, none of the report has described that the oxide has sufficient activity. For example, a process is proposed (British Patent No. 584,790), which comprises passing hydrogen chloride at an approximate temperature of 400° C. over a catalyst, prepared by allowing an aqueous chromic anhydride or chromium nitrate solution to impregnate into a suitable carrier followed by calcination, to generate chlorine, in cyclic repetitions of stopping the feed of hydrogen chloride upon deactivation of the catalyst, passing air to regenerate the catalyst, stopping the supply of air and passing again hydrogen chloride over the catalyst.

Further, using a catalyst which is supported dichromate or dark green chromium oxide on its carrier, hydrogen chloride and an oxygen-containing gas are reacted at a temperature of 420°-430° C. and a space velocity of 380 hr$^{-1}$ to attain a conversion rate of hydrogen chloride of 67.4% based on the equilibrium value (British Patent No. 676,667). In this case, the conversion is decreased to 63% at a higher space velocity of 680 hr$^{-1}$. The reaction may be observed even at a lower temperature of 340° C., in which case a low conversion rate of only 52% is obtained despite a low space velocity as low as 65 hr$^{-1}$. Since all of these processes are employing high reaction temperatures and low space velocities, their practical utilization is rather difficult.

On one hand, it has been found that a chromium oxide catalyst obtained by calcining, at a temperature of 800° C. or lower, a compound obtained by reacting an aqueous chromium salt solution with ammonia exhibits a high activity in the oxidation reaction of hydrogen chloride (Japanese Patent Laid-Open No. 275,104/86, U.S. Pat. No. 4,828,815). With this catalyst, it has become possible to produce chlorine at a lower temperature and a higher space time yield than with anyone of the conventional catalyst.

On the other hand, when used in the oxidation reaction of gaseous hydrogen chloride, this catalyst involves such problem that the activity is reduced in a few months after initiation of the reaction. In use of the catalyst, the higher the activity and the longer the life, the greater the industrial advantages.

SUMMARY OF THE INVENTION

The object of the present invention is to provide a process for stabilizing treatment of catalytic activity, which is useful for increasing the activity of a catalyst and prolonging the life thereof, the catalyst being composed principally of chromium oxide and used in the production of chlorine by the oxidation of hydrogen chloride.

Namely, the present invention provides a process for stabilizing treatment of catalytic activity of a catalyst, which comprises washing the catalyst with washing water subsequent to the preparation of the catalyst, the catalyst being composed principally of chromium oxide and used in the production of chlorine by the oxidation of hydrogen chloride with an oxygen-containing gas, wherein the amount of the washing water used is 1.5 to 7 times that of the catalyst, the washing water being heated to 20° C. or higher, and the hot water washing is effected for 30 minutes or more.

DETAILED DESCRIPTION OF THE INVENTION

In order to achieve the object of the present invention, the inventors have made intensive examination of processes for stabilizing treatment of catalytic activity. As a result, it has been found that catalysts obtained by washing those prepared in a conventional procedure with hot water of 20° C. or higher and drying the resultant catalysts prove to have higher activities than that of conventional catalysts and exhibit remarkably suppressed activity reduction, leading to completion of the present invention.

The catalyst prior to being subjected to the stabilizing treatment used in the present invention is prepared by calcining a mixture consisting of a reaction product of a chromium salt, such as chromium (III) nitrate, chromium (III) chloride and chromium (III) salts of organic acids, and ammonia and a silicon compound at a temperature of 800° C. or lower in accordance with the methods described in Japanese Patent Laid-Open Nos. 275,104/86 (U.S. Pat. No. 4,828,815) and 241,804/87.

Practical preparation of the catalyst is carried out in the procedure described hereunder.

An aqueous solution of the aforementioned chromium salts is reacted with aqueous ammonia to obtain a precipitate of chromium compounds. The concentration of the chromium salt may often be in the range of 3-30% by weight, while the aqueous ammonia may suitably have a concentration of 5-30% by weight.

To mix the precipitate of a chromium compound and a silicon compound, the aqueous solution of a chromium salt is mixed at first with a silicon compound, e.g.

ethyl silicate, etc., and then the mixture is reacted with aqueous ammonia to coprecipitate chromium hydroxides and silicon hydroxide, or the precipitate of a chromium compound and silica gel such as colloidal silica or a fine powder of silica gel are kneaded with water. The kneaded product is dried in air at room temperature, dried at 80°-120° C., and then calcined at a temperature of 800° C. or lower to prepare a catalyst.

The slurry mixture of the precipitate of chromium and the silicon compound is dried in a spray drier to form a spherical powder which is then calcined to prepare a product. This product is suitable as a catalyst for use in fluidized beds reaction. Further, the mixture of the precipitate of chromium and the silicon compound is formed into a paste, which is then extruded, dried and calcined to prepare a catalyst for fixed beds reaction.

Then, a method is illustrated of the water-washing treatment for stabilizing the activity of the catalyst thus prepared.

The amount of the washing water used in the present invention is usually 1.5 to 7 times that of the catalyst.

If the amount of the washing water is less than 1.5 times, no sufficient water-washing effects will be obtained. Further, any amounts in excess of 7 times will unfavorably result in poor economical efficiency and operability.

The temperature of the washing water is generally 20° C. or higher, while the washing time required is commonly at least 30 minutes.

If the temperature of the washing water is lower than 20° C. or the washing time is less than 30 minutes, no satisfactory water-washing effects will be obtained in either case. Thus, such conditions are not preferred.

The embodiment of the present invention will be described hereunder: The catalyst prepared in the procedure as described above and water are introduced into a flask and heated to 20° C. or higher, preferably 60° C. or higher, under agitation, the heating time being 30 minutes or more, and thereafter the catalyst is filtered and dried generally at a drying temperature of 60°-150° C.

As the feed hydrogen chloride used in the oxidation reaction of hydrochloric acid, hydrogen chloride by-produced in the chlorination of organic compounds or in the reaction of organic compounds with phosgene are often used.

As the oxidizing agent of hydrogen chloride, oxygen-containing gases are used, gaseous oxygen or air being particularly employed in general.

Gaseous oxygen is used where the type of the reactor is of a fluidized bed, while in the case of fixed beds, air is frequently used.

The molar ratio of the hydrogen chloride to the oxygen in an oxygen-containing gas, used in the reaction, is approximately one mole of hydrogen chloride to ¼ mole of oxygen (equivalent). In general, oxygen is often used in an amount of 5 to 200% in excess of the equivalent.

The amount of hydrogen chloride fed to the catalyst bed may suitably be in the range of 200 to 1,800 Nl/hr/kg.catalyst. The reaction temperature often employed is 300° to 450° C., particularly 360° to 420° C.

The life test of the catalysts obtained by the method for stabilizing treatment as described above has proved that the obtained catalysts have improved activities and also prolonged lives as compared with those prior to being subjected to the treatment.

It is estimated that by applying the aforesaid stabilizing treatment, it becomes possible to remove some water-soluble activity-obstructing substances, which can not be identified definitely but exert adverse effects upon the catalytic activity, and to increase the specific surface area, so that the catalytic activity is improved and the life is prolonged as well.

EXAMPLES

The method of the present invention will be described more specifically with reference to the following Referring Examples, Examples and Comparative Examples.

Referring Example 1

Into 714 g of a 40% chromium nitrate solution under sufficient agitation was added 600 g of 25% aqueous ammonia in 30 minutes. The precipitate thus formed was washed by decantation, filtered, dried in the atmospheric air, dried at 100°-120° C. for 12 hours, and then calcined at 500° C. for 3 hours. The resultant chromium oxide was ground in a mortar into a fine powder, which was added with 152 g of 20% silica sol (Snowtex N, Trade Mark of a product by Nissan Chemical Industries, Ltd.) and kneaded. The kneaded mixture was then concentrated to a paste, which was extruded into pellets of 5 mm$\phi$×6 mm. The pellets were calcined again at 500° C. for 5 hours to prepare a catalyst.

Example 1

In a three-neck flask provided with a thermometer, a reflux condenser and an agitator were charged 100 g of the untreated catalyst prepared in Referring Example 1 and 300 ml of distilled water. The contents were heated up under agitation to 80° C. and the agitation was continued for additional one hour. The contents were cooled down to 40° C., filtered by means of a Nutsche funnel, washed twice with 100 ml of distilled water, and then dried at 80° C. for 3 hours to obtain a catalyst (quantitatively). Fifty grams of the catalyst having thus undergone the stabilizing treatment was packed in a SUS 316 type stainless steel-made reactor with an inner diameter of one inch. Gaseous hydrogen chloride and oxygen were introduced into the catalyst bed at rates of 800 Nml/min and 400 Nml/min, respectively (space velocity: 1,440 Nml/g/hr), and the reactor was heated outside by an electric heater at 370° C. to effect the reaction. The conversion rate of hydrogen chloride at a time 3 days after initiation of the reaction wa 76%. On the 30th day after initiation of the reaction, the conversion rate was 73%, while that on the 65th day was 70%.

Comparative Example 1

Fifty grams of the catalyst prepared in Referring Example 1 and having not undergone the stabilizing treatment was packed in a SUS 316 type stainless steel-made reactor with an inner diameter of one inch, and the reaction was conducted under the same reaction conditions. The conversion rate of hydrogen chloride at 3 days after initiation of the reaction was 74%. On the 30th day after initiation of the reaction, the conversion rate was 70%, while on the 65th day, it was decreased to 62%.

Referring Example 2

To 71.4 kg of a 40 wt % aqueous chromium nitrate solution was added 310 kg of deionized water. Thereafter, 60 kg of 25 wt % aqueous ammonia was added therein dropwise over 5 hours. During the dropping, the mother liquor was well agitated and the reaction temperature was maintained in a range of 45°-50° C.

The precipitate thus formed was matured at 50° C. for 3 hours, followed by washing and filtration. Then, the precipitate was mixed with 15 kg of 20 wt % silica sol under sufficient agitation. The slurry thus formed had a concentration of 6 wt %. The slurry was sprayed at a feed pressure of 10 kg/cm$^2$G by means of a spray dryer having a pressure nozzle of 1.2 mm diameter to form microprills at an inlet air temperature of 320° C. The resulting microprills were calcined at 520° C. for 5 hours to prepare a catalyst. The average particle size of the catalyst was 60 μm and its specific surface area was 213 cm$^2$/g.

Example 2

Into a 5 liters type three-neck flask equipped with a thermometer, reflux condenser and agitator were charged 1 kg of the fluidizing bed catalyst of untreated microprills prepared in Referring Example 2 and 3 liters of distilled water. Under agitation, the contents were heated up to 100° C., and reflux was continued for additional 2 hours under agitation. The contents were cooled down to 40° C., filtered by means of a Nutsche funnel, and then washed twice with 1 liter of distilled water. The resulting solid was dried at 80° C. for 3 hours to obtain a stabilized catalyst (specific surface area : 245 cm$^2$/g).

Forty grams of the catalyst thus having undergone the stabilizing treatment was packed in a glass-made fluidized bed reactor with an inner diameter of one inch. Gaseous hydrogen chloride and oxygen were passed into the catalyst bed at rates of 334 ml/min and 167 ml/min, respectively (space velocity: 752 Nml/g/hr), and the reactor was heated from outside in an annular electric furnace at an inner temperature of 380° C. to effect the reaction. The conversion rate at 3 days after initiation of the reaction was 75%. On the 30th day after initiation of the reaction, the conversion rate was 72%, while that on the 65th day was 65%.

Comparative Example 2

Using 40 g of the catalyst obtained in Referring Example 2 and having not undergone the stabilizing treatment, the reaction was conducted under exactly the same reaction conditions as in Example 2. The conversion rate of hydrogen chloride at 3 days after initiation of the reaction was 72%. On the 30th day after initiation of the reaction, the conversion rate was 68%, while on the 65th day, it was reduced to 55%.

Example 3

In a nickel-made fluidized bed reactor with an inner diameter of 4 inch was packed 0.5 kg of the catalyst having undergone the stabilizing treatment obtained in Example 2, and waste gaseous hydrogen chloride and oxygen were introduced therein at rates of 500 Nl/kg.cat/hr and 250 Nl/kg.cat/hr, respectivety (space velocity: 750 Nml/g/hr) to react at a temperature of 390° C. The conversion rate of hydrogen chloride was 76% at the beginning, 73% on the 30th day after initiation of the reaction, and 70% on the 65th day.

Comparative Example 3

Using 0.5 kg of the catalyst obtained in Referring Example 2 and having not undergone the stabilizing treatment, the reaction was conducted under exactly the same conditions as in Example 3. The conversion rate of hydrogen chloride was 73% at the beginning, but the rate was 67% on the 30th day after initiation of the reaction, and 57% on the 65th day.

According to the method of the present invention, it is possible to stabilize the catalytic activity of a catalyst principally comprising chromium oxide by simplified subjecting the catalyst to a water-washing treatment subsequent to the preparation thereof, the catalyst being used in the production of chlorine by the catalytic oxidation of hydrogen chloride.

Thus, the stabilizing treatment permits the activity to be improved and the life to be prolonged, with the result that the catalyst cost in the production cost of chlorine can be reduced.

What is claimed is:

1. A method for stabilizing the catalytic activity of a finished coprecipitated catalyst composed principally of chromium oxide and used in the product of chlorine by the oxidation of hydrogen chloride with an oxygen-containing gas, which comprises washing the coprecipitated catalyst with water after preparation of the coprecipitated catalyst by calcination.

2. A method according to claim 1 wherein the amount of water used is 1.5 to 7 times the amount of the catalyst.

3. A method according to claim 1 wherein the water is heated to 20° C. or higher, and the washing is conducted for 30 minutes or more.

4. A method according to claim 2 wherein the water is heated to 20° C. or higher, and the washing is conducted for 30 minutes or more.

5. A method according to claim 1 wherein the finished catalyst is obtained by calcining a mixture of a reaction product of a chromium compound with ammonia and a silicon compound at 800° C. or lower.

6. A method for stabilizing treatment according to claim 5 wherein the chromium compound is chromium (III) nitrate, chromium (III) chloride or a chromium (III) salt of an organic acid.

7. A method for stabilizing treatment according to claim 5 wherein the calcining temperature is up to 800° C.

8. A method for stabilizing treatment according to claim 6 wherein the calcining temperature is up to 800° C.

* * * * *